United States Patent
Park et al.

(10) Patent No.: US 8,736,639 B2
(45) Date of Patent: May 27, 2014

(54) DRIVING SYSTEM FOR BACKLIGHT UNIT, LIQUID CRYSTAL DISPLAY DEVICE INCLUDING THE SAME AND METHOD OF DRIVING THE SAME

(75) Inventors: Yun-Seo Park, Gyeonggi-do (KR); Jeong-Whan Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 413 days.

(21) Appl. No.: 12/827,245

(22) Filed: Jun. 30, 2010

(65) Prior Publication Data
US 2011/0141152 A1   Jun. 16, 2011

(30) Foreign Application Priority Data
Dec. 11, 2009  (KR) .................. 10-2009-0123497

(51) Int. Cl.
G09G 5/10   (2006.01)
G09G 3/36   (2006.01)

(52) U.S. Cl.
USPC ........................................ 345/690; 345/102

(58) Field of Classification Search
None
See application file for complete search history.

(56) References Cited

U.S. PATENT DOCUMENTS

| 6,982,686 B2 * | 1/2006 | Miyachi et al. ............. 345/73 |
| 2006/0055660 A1 | 3/2006 | Teranishi |
| 2006/0238485 A1 | 10/2006 | Yang |
| 2006/0279516 A1 * | 12/2006 | Yun .............................. 345/102 |
| 2007/0171218 A1 * | 7/2007 | Hong et al. .................. 345/211 |
| 2008/0158139 A1 | 7/2008 | Kim |
| 2009/0073109 A1 * | 3/2009 | Shin et al. ..................... 345/102 |
| 2009/0146942 A1 * | 6/2009 | Lee et al. ...................... 345/102 |

FOREIGN PATENT DOCUMENTS

| CN | 101211544 A | 7/2008 |
| KR | 10-2008-0110379 A | 12/2008 |
| KR | 10-2009-0059179 A | 6/2009 |
| TW | 200622983 A | 7/2006 |
| TW | 200638330 A | 11/2006 |

OTHER PUBLICATIONS

Chinese Office Action (Application No. 201010299836.8), dated Sep. 29, 2012.
KIPO: Office Action for Korean Patent Application No. 10-2009-0123497—Issued on May 29, 2013.
Office Action dated Aug. 13, 2013 issued in Taiwanese Patent Application No. 099121578.

* cited by examiner

*Primary Examiner* — Joseph Haley
*Assistant Examiner* — Emily Frank
(74) *Attorney, Agent, or Firm* — Morgan, Lewis & Bockius LLP

(57) ABSTRACT

A driving system for a backlight unit includes: a system unit outputting first and second dimming signals for driving the backlight unit; and an inverter unit driving the backlight unit with a 2-block scanning method using the first and second dimming signals received directly from the system unit.

17 Claims, 5 Drawing Sheets

DRIVING SYSTEM FOR BACKLIGHT UNIT, LIQUID CRYSTAL DISPLAY DEVICE INCLUDING THE SAME AND METHOD OF DRIVING THE SAME

This application claims the benefit of Korean Patent Application No. 10-2009-0123497, filed on Dec. 11, 2009, which is hereby incorporated by reference in its entirety.

BACKGROUND OF THE INVENTION

1. Field of the Invention

The present invention relates to a liquid crystal display device, and more particularly, to a driving system for a backlight unit where a dimming signal is supplied from a system unit to an inverter unit, a liquid crystal display device including the driving system and a method of driving the liquid crystal display device.

2. Discussion of the Related Art

In general, liquid crystal display (LCD) device have advantages such as a light weight, a thin profile and a low power consumption and have been widely used for a notebook computer, an office automation apparatus and a audio/video machine. Specifically, active matrix liquid crystal display (AM-LCD) devices where a thin film transistor (TFT) is used as a switching element have advantages in displaying moving images.

FIG. 1 is a view showing a liquid crystal display device according to the related art. In FIG. 1, a liquid crystal display (LCD) device 10 includes a liquid crystal panel 20, a backlight unit 30, a control unit 40, an inverter unit 50 and a system unit 60. The backlight unit 30 supplies light to the liquid crystal panel 20, and the control unit 40 supplies a control signal, a gate signal and a data signal to the liquid crystal panel 20. The inverter unit 50 controls a power supplied to the backlight unit 30, and the system unit 60 controls the control unit 40 and the inverter unit 50.

Although not shown in FIG. 1, the liquid crystal panel 20 includes a plurality of pixel regions and displays images using the gate signal and the data signal. The backlight unit 30 includes a plurality of lamps for supplying light to the liquid crystal panel 20. The control unit 40 includes a printed circuit board (PCB) having a timing controller 42 and a driving integrated circuit (D-IC) thereon. The control unit 40 supplies a plurality of control signals and an RGB signal for displaying images to the liquid crystal panel 20. In addition, the control unit 40 receives a dimming signal for controlling the backlight unit 30 from the system unit 60 and supplies the dimming signal to the inverter unit 50 with or without modulation. The inverter unit 50 controls emission of the backlight unit 30 using the dimming signal from the control unit 40. The system unit 60 supplies an image signal and a plurality of driving signals to the control unit 40 and supplies the dimming signal to the inverter unit 50. The system unit 60 includes an external interface circuit such as a television system and a graphic card.

In a cathode ray tube (CRT) of an impulsive type where an image is instantly displayed during a frame, deterioration seldom occurs in displaying a moving image. In an LCD device of a continuous type where an image is continuously displayed during a frame, the deterioration such as a motion blur and a tailing may occur in displaying a moving image because of a slow response property and a holding property of the liquid crystal. For example, the motion blur may refer to a blur of a moving object in an image and the tailing may refer to a border drag of an object in an image. The deterioration of the moving image in the LCD device may not be completely removed even when the response time of the liquid crystal is shorter than the single frame.

To improve the deterioration of the moving image in the LCD device, a scanning method of driving the backlight unit of the LCD device has been suggested.

FIGS. 2A and 2B are perspective views showing a scanning method of driving a backlight unit of a liquid crystal display device according to the related art, and FIG. 3 is a view showing emission control signals for a scanning method of driving a backlight unit of a liquid crystal display device according to the related art. In FIGS. 2A, 2B and 3, first to eighth lamps L1 to L8 are disposed under a liquid crystal panel 20, and the liquid crystal panel 20 includes first, second and third regions A1, A2 and A3 divided according to simultaneous on and off of the first to eighth lamps L1 to L8. In addition, the first and second regions A1 and A2 corresponding to upper and lower portions of the liquid crystal panel 20 is defined as a first block B1 where the first, second, seventh and eighth lamps L1, L2, L7 and L8 are simultaneously turned on and off, and the third region A3 corresponding to a middle portion of the liquid crystal panel 20 is defined as a second block B2 where the third, fourth, fifth and sixth lamps L3, L4, L5 and L6 are simultaneously turned on and off.

The first block B1 including the first, second, seventh and eighth lamps L1, L2, L7 and L8 and the second block B2 including the third, fourth, fifth and sixth lamps L3, L4, L5 and L6 are turned on and off at a timing different timing with each other. For example, the first, second, seventh and eighth lamps L1, L2, L7 and L8 of the first block B1 are turned off during a first half frame of a single frame and turned on during a second half frame of the single frame, while the third, fourth, fifth and sixth lamps L3, L4, L5 and L6 are turned on during a first period slightly prior to the first half frame of the single frame and turned off during a second period slightly prior to the second half frame of the single frame.

Accordingly, in the LCD device driven by a 2-block scanning method, only a middle portion of an image corresponding to the second block B2 is displayed during most of the first half frame of the single frame and no image is displayed during a last part of the first half frame of the single frame. In addition, only upper and lower portions of the image corresponding to the first block B1 are displayed during most of the second half frame of the single frame, and the whole image corresponding to the first and second blocks B1 and B2 is displayed during a last part of the second half frame of the single frame. Since only the middle portion of the image corresponding to the second block B2 is displayed during most of the first half frame of the single frame and only the upper and lower portions of the image corresponding to the first block B1 are displayed during most of the second half frame of the single frame, the image are displayed similarly to an impulsive type of the CRT. The LCD device driven by a scanning method may have a quasi-impulsive type. As a result, deterioration in display quality of a moving image such as a motion blur and a tailing is improved.

In an LCD device driven by a 2-block scanning method, since a plurality of lamps of a backlight unit are divided into two blocks and the two blocks including the plurality of lamps are turned on and off at different timings, two dimming signals for the two blocks are required. Accordingly, the system unit 60 transmits first and second dimming signals to the control unit 40, and the control unit 40 transmits the first and second dimming signals to the inverter unit 50. The inverter unit 50 adjusts lighting of the first, second, seventh and eighth lamps L1, L2, L7 and L8 using the first dimming signal and adjusts lighting of the third, fourth, fifth and sixth lamps L3, L4, L5 and L6 using the second dimming signal. The system unit 60, the control unit 40 and the inverter unit 50 may be defined as a driving system for a backlight unit 30.

FIG. 4 is a view showing a driving system for a backlight unit of a liquid crystal display device according to the related art. In FIG. 4, a system unit 60 includes first and second system connectors 60a and 60b, a control unit 40 includes first and second control connectors 40a and 40b, and an inverter unit 50 includes first and second inverter connectors 50a and 50b. The first system connector 60a of the system unit 60 is connected to the first inverter connector 50a of the inverter unit 50 through a first cable CB1, and the second system connector 60b of the system unit 60 is connected to the first control connector 40a of the control unit 40 through a second cable CB2. In addition, the second control connector 40b of the control unit 40 is connected to the second inverter connector 50b of the inverter unit 50 through a third cable CB3. The first, second and third cables CB1, CB2 and CB3 may include a flexible flat cable (FFC).

The system unit 60 transmits a driving power source signal, a lamp flash signal and a lamp status signal to the inverter unit 50 through the first system connector 60a, the first cable CB1 and the first inverter connector 50a. For example, each of the first system connector 60a, the first cable CB1 and the first inverter connector 50a may include 14 pins. A pin map for the 14 pins is illustrated in TABLE 1.

TABLE 1

| pin number | symbol | illustration of signal |
| --- | --- | --- |
| 1~5 | VBL | power source voltage (+24 V) |
| 6~10 | GND | ground voltage |
| 11 | NC | no connection |
| 12 | VON/OFF | voltage for turning on and off lamp (0 V~5 V) |
| 13 | NC | no connection |
| 14 | STATUS | lamp status |

The system unit 60 transmits first and second dimming signals and an image signal to the control unit 40 through the second system connector 60b, the second cable CB2 and the first control connector 40a. In addition, the control unit 40 transmits the first and second dimming signals to the inverter unit 50 through the second control connector 40b, the third cable CB3 and the second inverter connector 50b.

The control unit 40 includes a timing controller 42, and the first and second dimming signals received from the system unit 60 is transmitted to the inverter unit 50 without modulation or with modulation by the timing controller 42. Accordingly, the control unit 40 transmits the first and second dimming signals to the inverter unit 50 without modulation. Alternatively, the control unit 40 modulates the first and second dimming signals based on a result of analyzing the image signal by the timing controller 42 and transmits the modulated first and second dimming signals to the inverter unit 50. For example, each of the second control connector 40b, the third cable CB3 and the second connector 50b may include 4 pins. A pin map for the 4 pins is illustrated in TABLE 2.

TABLE 2

| pin number | symbol | illustration of signal |
| --- | --- | --- |
| 1 | OPTION | option |
| 2 | SCAN1 | first dimming signal |
| 3 | SCAN2 | second dimming signal |
| 4 | GN\D | ground voltage |

In a driving system for a backlight unit of an LCD device according to the related art, a plurality of signals including first and second dimming signals are transmitted through a plurality of connectors and a plurality of connectors and the backlight unit is driven by a 2-block scanning method, thereby deterioration in displaying a moving image improved. However, since a lot of connectors and cables are used in the driving system, the structure of the driving system becomes complicated and fabrication cost of the LCD device increases.

SUMMARY OF THE INVENTION

Accordingly, the present invention is directed to a driving system for a backlight unit, a liquid crystal display device including the same and a method of driving the same that substantially obviate one or more of the problems due to limitations and disadvantages of the related art.

An advantage of the present invention is to provide a driving system for a backlight, a liquid crystal display device including the driving system and a method of driving the liquid crystal display device where a structure of the driving system is simplified by reducing a transmission path of a dimming signal for a scanning method of driving the backlight unit without change of a pin map.

Another advantage of the present invention is to provide a driving system for a backlight, a liquid crystal display device including the driving system and a method of driving the liquid crystal display device where a fabrication cost decreases by reducing the number of connectors and cables due to reduction of a transmission path of a dimming signal for a scanning method of driving the backlight unit.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a driving system for a backlight unit includes: a system unit outputting first and second dimming signals for driving the backlight unit; and an inverter unit driving the backlight unit with a 2-block scanning method using the first and second dimming signals received directly from the system unit.

In another aspect, a liquid crystal display device includes: a liquid crystal panel displaying an image; a backlight unit supplying a light to the liquid crystal panel; a control unit supplying a gate signal and a data signal to the liquid crystal panel; an inverter unit driving the backlight unit with a 2-block scanning method using first and second dimming signals; and a system unit transmitting the first and second dimming signals directly to the inverter unit.

In another aspect, a method of driving a liquid crystal display device includes: transmitting a gate control signal, a data control signal and an RGB signal for displaying an image from a system unit to a control unit and transmitting first and second dimming signal for driving a backlight unit from the system unit to an inverter unit: generating a gate signal and a data signal using the gate control signal, the data control signal and the RGB signal in the control unit and transmitting the gate signal and the data signal from the control unit to a liquid crystal panel; displaying the image using the gate signal and the data signal by the liquid crystal panel; driving the backlight unit with a 2-block scanning method using the first and second dimming signals by the inverter unit; and supplying a light of the backlight unit to the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 1:
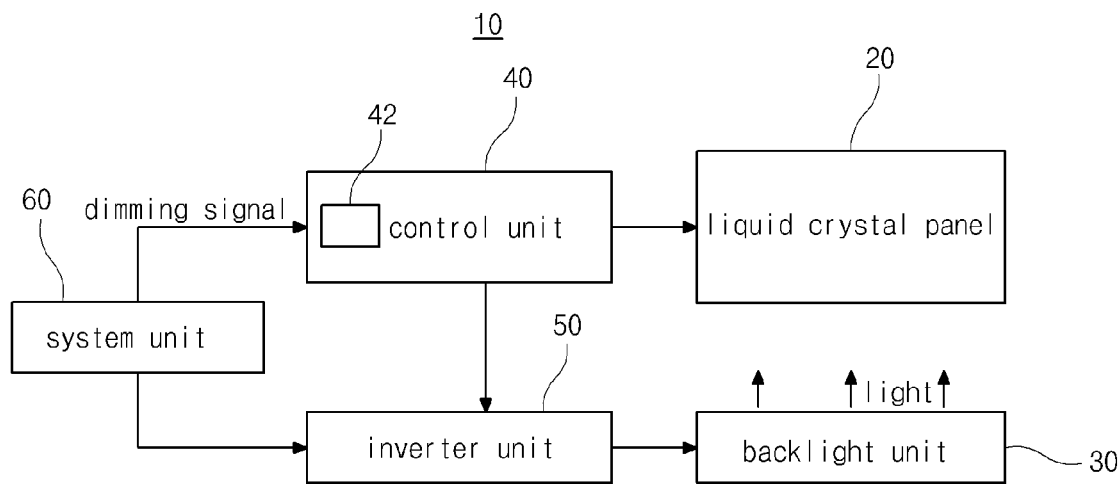
FIG. 1 is a view showing a liquid crystal display device according to the related art.
Figure 2A:
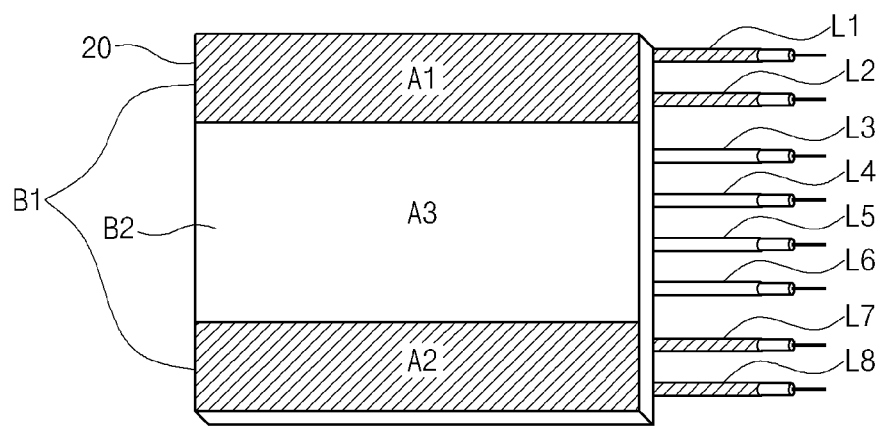
FIGS. 2A and 2B are perspective views showing a scanning method of driving a backlight unit of a liquid crystal display device according to the related art.
Figure 2B:
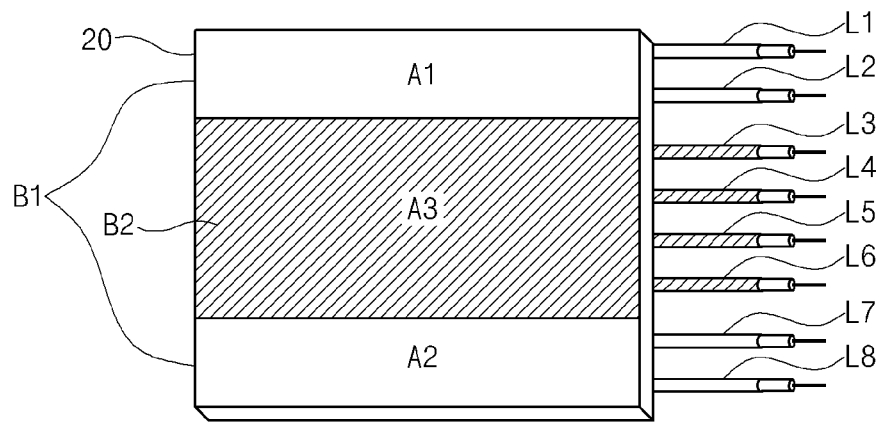
Figure 3:
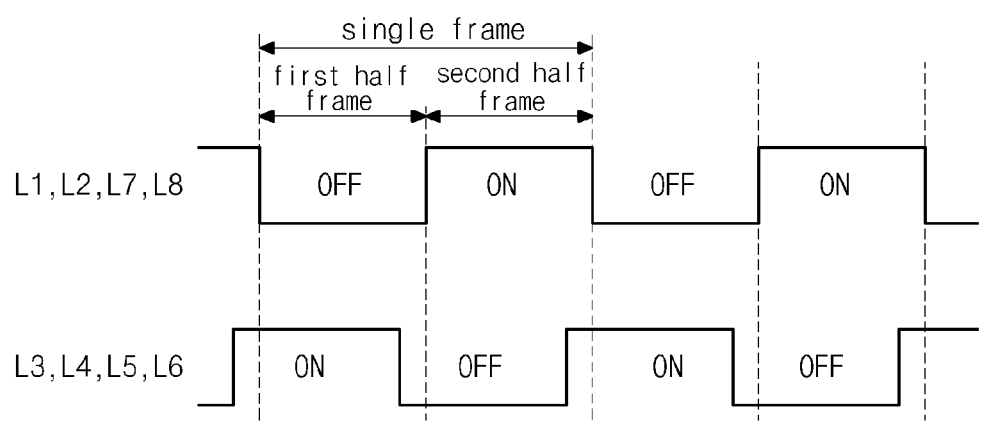
FIG. 3 is a view showing emission control signals for a scanning method of driving a backlight unit of a liquid crystal display device according to the related art.
Figure 4:
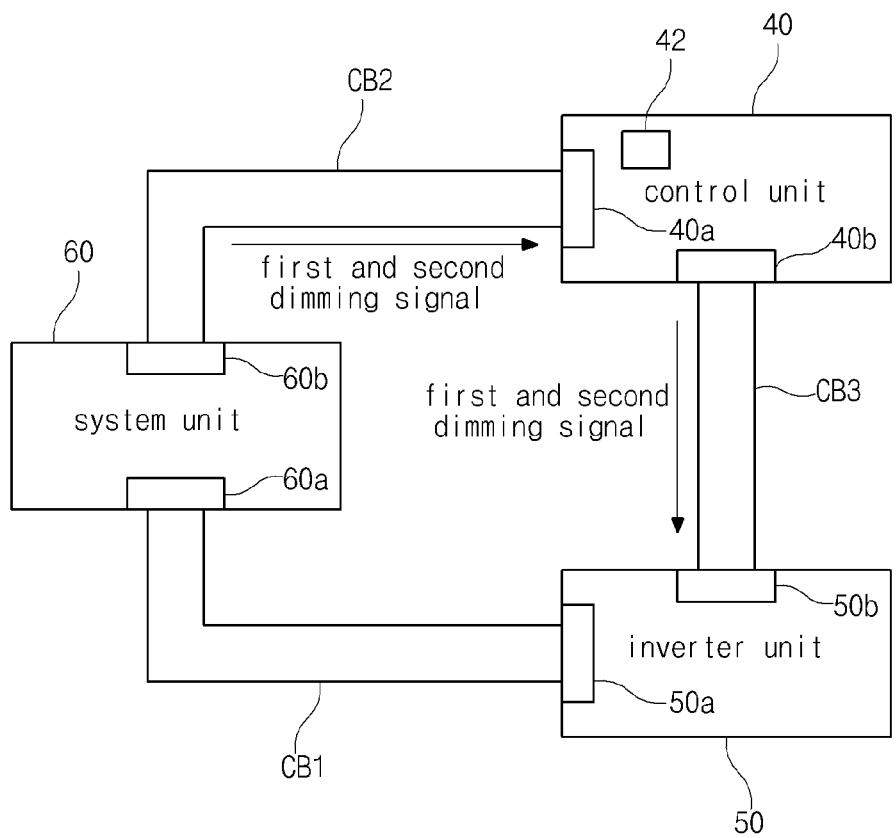
FIG. 4 is a view showing a driving system for a backlight unit of a liquid crystal display device according to the related art.
Figure 5:
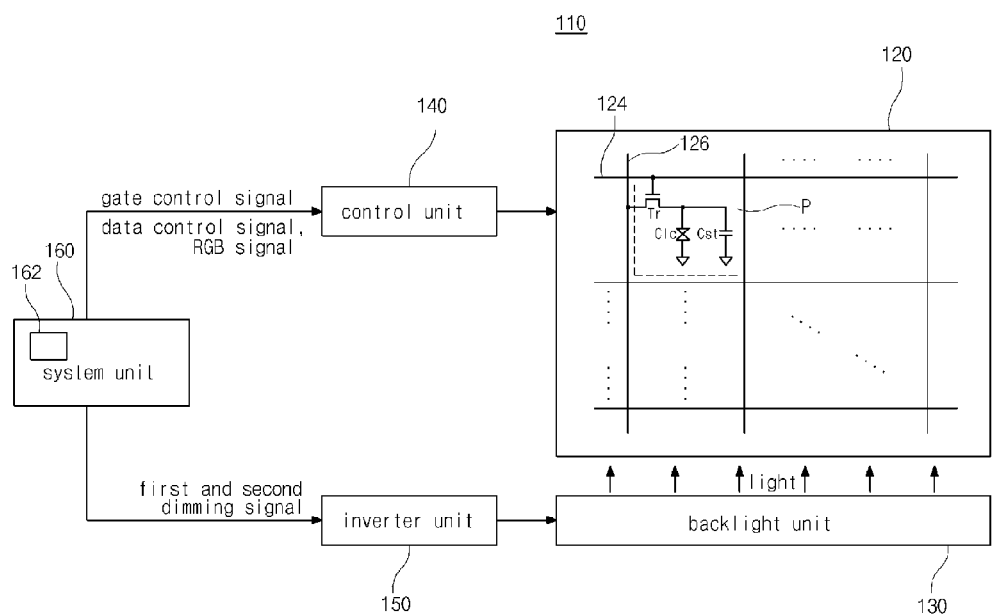
FIG. 5 is a view showing a liquid crystal display device according to an embodiment of the present invention.

FIG. 5 is a view showing a liquid crystal display device according to an embodiment of the present invention.

In FIG. 5, a liquid crystal display (LCD) device 110 includes a liquid crystal panel 120, a backlight unit 130, a control unit 140, an inverter unit 150 and a system unit 160. The backlight unit 130 supplies light to the liquid crystal panel 120, and the control unit 140 supplies a control signal, a gate signal and a data signal to the liquid crystal panel 120. The inverter unit 150 controls a power supplied to the backlight unit 130 such that turning on and off lamps of the backlight unit 130 is controlled by the inverter unit 150. The system unit 160 controls the control unit 140 and the inverter unit 150. The control unit 140, the inverter unit 150 and the system unit 160 may be defined as a driving system for the backlight unit 130 that drives lamps of the backlight unit 130 to be turned on and off.

The liquid crystal panel 120 includes first and second substrates (not shown) facing and spaced apart from each other and a liquid crystal layer (not shown) between the first and second substrates. A gate line 124 and a of data line 126 are formed on an inner surface of the first substrate. The gate lines 124 crosses the data line 126 to define a pixel region P. In addition, a thin film transistor (TFT) Tr, a liquid crystal capacitor Clc and a storage capacitor Cst are formed on the inner surface of the first substrate. The TFT Tr is connected to the gate line 124 and the data line 126, and the liquid crystal capacitor Clc and the storage capacitor Cst are connected to the TFT Tr. When the TFT Tr is turned on according to a gate signal applied to the gate line 124 of the liquid crystal panel 120, a data signal applied to the data line 126 of the liquid crystal panel 120 is supplied to the liquid crystal capacitor Clc and the storage capacitor Cst through the TFT Tr, and the liquid crystal panel 120 displays an image.

The backlight unit 130 includes a plurality of lamps for supplying light to the liquid crystal panel 120. For example, the plurality of lamps may include one of a cold cathode fluorescent lamp (CCFL), an external electrode fluorescent lamp (EEFL) and a light emitting diode (LED) lamp. Although not shown in FIG. 5, the control unit 140 includes a gate driving integrated circuit (D-IC), a data D-IC and a printed circuit board (PCB) connected to the gate D-IC and the data D-IC. The gate D-IC and the data D-IC generate the gate signal and the data signal, respectively, using a gate control signal, a data control signal and an RGB signal received from the system unit 160, and the gate signal and the data signal are applied to the gate line 124 and the data line 126, respectively, of the liquid crystal panel 120.

The inverter unit 150 controls turning on and off the plurality of lamps of the backlight unit 130 using first and second dimming signals for controlling the backlight unit 130 received from the system unit 160. The system unit 160 which is an external interface circuit such as a television system and a graphic card may include a timing controller 162. The system unit 160 generates an image signal, a data enable signal, a horizontal synchronization signal, a vertical synchronization signal and a clock signal for displaying an image and supplies the image signal, the data enable signal, the horizontal synchronization signal, the vertical synchronization signal and the clock signal to the timing controller 162. The timing controller 162 generates the gate control signal, the data control signal and the RGB signal using the image signal, the data enable signal, the horizontal synchronization signal, the vertical synchronization signal and the clock signal and supplies the gate control signal, the data control signal and the RGB signal to the control unit 140.

In addition, the system unit 160 generates the first and second dimming signals for driving the backlight unit 130 with a 2-block scanning method and supplies the first and second dimming signals to the inverter unit 150. Accordingly, the first and second dimming signals are directly transmitted from the system unit 160 to the inverter unit 150 without through the control unit 140. The system unit 160 transmits a driving power source signal, a lamp flash signal and a lamp status signal to the inverter unit 150, and the first and second dimming signals together with the driving power source signal, the lamp flash signal and the lamp status signal are directly transmitted from the system unit 160 to the inverter unit 150 without passing through the control unit 140.

After the system unit 160 generates the first and second dimming signals, the system unit 160 may transmit the first and second dimming signals intactly without modulation. Alternatively, the system unit 160 may modulate the first and second dimming signals using a result of analyzing the image signal by the timing controller 162 and may transmit the modulated first and second dimming signals to the inverter unit 150. The first and second dimming signals may have one of an analog type and a pulse width modulation (PWM) type. Alternatively, the first and second dimming signals may have a combination of an analog type and a PWM type. For example, when the plurality of lamps of the backlight unit 130 include 22 fluorescent lamps parallel to and spaced apart from each other, the first block may include 5 fluorescent lamps corresponding to an upper portion of the liquid crystal panel 120 and 6 fluorescent lamps corresponding to a lower portion of the liquid crystal panel 120, and the second block may include 11 fluorescent lamps corresponding to a middle portion of the liquid crystal panel 120.

In the LCD device according to an embodiment of the present invention, since the first ands second dimming signals are directly transmitted from the system unit 160 to the inverter unit 150, no signals are transmitted from the control unit 140 to the inverter unit 150 and a connector and a cable for connecting the control unit 140 and the inverter unit 150 are omitted. As a result, the LCD device is simplified and a fabrication cost is reduced.

Figure 6:
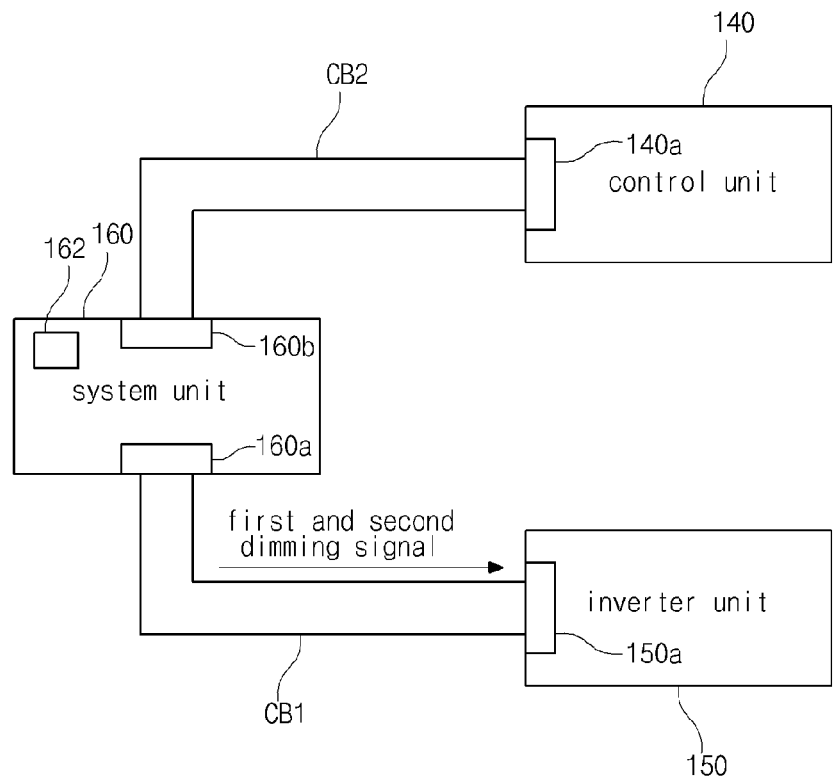
FIG. 6 is a view showing a driving system for a backlight unit of a liquid crystal display device according to an embodiment of the present invention.

FIG. 6 is a view showing a driving system for a backlight unit of a liquid crystal display device according to an embodiment of the present invention.

In FIG. 6, a system unit 160 includes first and second system connectors 160a, 160b, a control unit 140 includes a first control connector 140a, and an inverter unit 150 includes a first inverter connector 150a. The first system connector 160a of the system unit 160 is connected to the first inverter connector 150a of the inverter unit 150 through a first cable CB1, and the second system connector 160b of the system unit 160 is connected to the first control connector 140a of the control unit 140 through a second cable CB2. The first and second cables CB1, CB2 and CB3 may include a flexible flat cable (FFC).

The system unit 160 transmits a driving power source signal, a lamp flash signal, a lamp status signal, a first dimming signal and a second dimming signal to the inverter unit 150 through the first system connector 160a, the first cable CB1 and the first inverter connector 150a. For example, each of the first system connector 160a, the first cable CB1 and the first inverter connector 150a may include 14 pins. A pin map for the 14 pins of the first system connector 160a, the first cable CB1 and the first inverter connector 150a is illustrated in TABLE 3.

TABLE 3

| pin number | symbol | illustration of signal |
| --- | --- | --- |
| 1~5 | VBL | power source voltage (+24 V) |
| 6~10 | GND | ground voltage |
| 11 | SCAN1 | first dimming signal |
| 12 | VON/OFF | voltage for turning on and off lamp (0 V~5 V) |
| 13 | SCAN2 | second dimming signal |
| 14 | STATUS | lamp status |

The system unit 160 may include a timing controller 162, and the first and second dimming signals generated in the system unit 160 is transmitted to the inverter unit 150 without modulation or with modulation by the timing controller 162. Accordingly, after the system unit 160 generates the first and second dimming signals, the system unit 160 transmits the first and second dimming signals to the inverter unit 150 without modulation. Alternatively, after the system unit 160 generates the first and second dimming signals, the system unit 160 modulates the first and second dimming signals based on a result of analyzing the image signal by the timing controller 162 and transmits the modulated first and second dimming signals to the inverter unit 150. In addition, the system unit 160 transmits a gate control signal, a data control signal and an RGB signal generated by the timing controller 162 to the control unit 140 through the second system connector 160b, the second cable CB2 and the first control connector 140a.

In the LCD device according to an embodiment of the present invention, since the first and second dimming signals are directly transmitted from the system unit 160 to the inverter unit 150 through the first system connector 160a, the first cable CB1 and the first inverter connector 150a transmitting the driving power source signal, the lamp flash signal and the lamp status signal, the connectors and the cables between the control unit 140 and the inverter unit 150 are omitted without addition of the connectors and the cables and without change of the pin map. As a result, the structure of the LCD device is simplified and the fabrication cost is reduced.

The inverter unit 150 driving a backlight unit with a 2-block scanning method using first and second dimming signals will be illustrated hereinafter.

Figure 7:
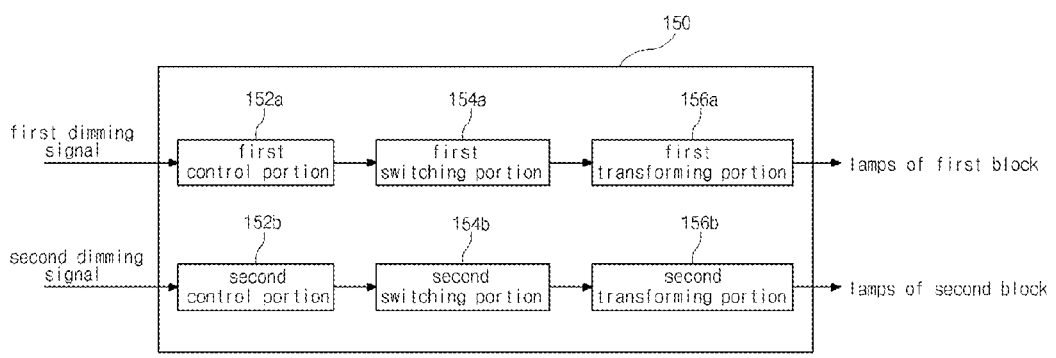
FIG. 7 is a view showing an inverter unit of a liquid crystal display device according to an embodiment of the present invention.

FIG. 7 is a view showing an inverter unit of a liquid crystal display device according to an embodiment of the present invention.

In FIG. 7, an inverter unit 150 of a liquid crystal display (LCD) device includes first and second control portions 152a and 152b, first and second switching portions 154a and 154b, and first and second transforming portions 156a and 156b. The first control portion 152a, the first switching portion 154a and the first transforming portion 156a control turning on and off the lamps of the first block using a first dimming signal supplied by the system unit 160. In addition, the second control portion 152b, the second switching portion 154b and the second transforming portion 156b control turning on and off the lamps of the second block using a second dimming signal supplied by the system unit 160. The first control portion 152a, the first switching portion 154a and the first transforming portion 156a may have the same functions as the second control portion 152b, the second switching portion 154b and the second transforming portion 156b except for turning the lamps of the first and second blocks at different timings.

The first and second control portions 152a and 152b generate first and second switching control signals, respectively, using a triangle wave pulse and a reference voltage and supply the first and second switching control signals to the first and second switching portions 154a and 154b, respectively. The first and second switching portions 154a and 154b convert the driving power source signal of a direct current (DC) type into the driving power source signal of an alternating current (AC) type using the first and second control signals from the first and second control portions 152a and 152b, respectively. Each of the first and second switching portions 154a and 154b may include at least one switching element.

Further, the first and second transforming portions 156a and 156b increase a voltage level of the AC type driving power source signal from the first and second switching portions 154a and 154b and supply the high-level AC type driving power source signal to the lamps of the first and second blocks, respectively. For example, each of the first and second transforming portions 156a and 156b may include a first coil connected to one of the first and second switching portions 154a and 154b and a second coil connected to the lamps. A first end of the second coil may be connected to an electrode of the lamps and a second end of the second coil may be connected to the ground voltage GND. Accordingly, the low-level AC type driving power source signal applied to the first coil of each of the first and second transforming portions 156a and 156b induces the high-level AC type driving power source signal in the second coil of each of the first and second transforming portions 156a and 156b according to turns ratio of the first and second coils, and the high-level AC type driving power source signal is supplied to the lamps of the first and second blocks.

In the LCD device according to an embodiment of the present invention, the inverter unit 150 drives the backlight unit 130 with a 2-block scanning method such that the lamps of the first and second blocks are turned on and off at different timings using the driving power source signal, the lamp flash signal, the lamp status signal, the first dimming signal and the second dimming signal directly transmitted from the system unit 160 to the inverter unit 150.

In the LCD device of the present invention, consequently, since the dimming signals are directly transmitted from the system unit to the inverter unit, the total number of the connectors and the cables in the driving system for the backlight unit is reduced and the fabrication cost is reduced. In addition, since the dimming signals are transmitted without change of the pin map of the connectors and the cables between the system unit and the inverter unit, the structure of the driving system for the backlight unit is simplified. Moreover, since the timing controller is integrated in the system unit, the structure of the driving system for the backlight unit is further simplified and the fabrication cost is further reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A driving system for a backlight unit, comprising:
a system unit configured to generate:
first and second dimming signals for driving the backlight unit;
an image signal;
a data enable signal;
a horizontal synchronization signal;
a vertical synchronization signal;
a clock signal for displaying an image;
a gate control signal;
a data control signal; and
an RGB signal using the image signal, the data enable signal, the horizontal synchronization signal, the vertical synchronization signal, and the clock signal;
a control unit configured to generate a gate signal and a data signal using the gate control signal, the data control signal, and the RGB signal received from the system unit; and
an inverter unit configured to drive the backlight unit with a 2-block scanning method using the first and second dimming signals received directly from the system unit.

2. The driving system according to claim 1, wherein:
the system unit includes first and second system connectors;
the inverter unit includes a first inverter connector; and
the first system connector is connected to the first inverter connector through a first cable.

3. The driving system according to claim 2, wherein:
each of the first system connector, the first cable, and the first inverter connector includes 14 pins; and
the system unit transmits a driving power source signal, a lamp flash signal, a lamp status signal, the first dimming signal, and the second dimming signal to the inverter unit through the first system connector, the first cable, and the first inverter connector.

4. The driving system according to claim 1, wherein the system unit transmits the first and second dimming signals to the inverter unit without modulation.

5. The driving system according to claim 1, wherein the system unit:
modulates the first and second dimming signals based on a result of analyzing the image signal by a timing controller of the system unit; and
transmits the first and second dimming signals to the inverter unit.

6. A liquid crystal display device, comprising:
a liquid crystal panel configured to display an image;
a backlight unit configured to supply a light to the liquid crystal panel;
a control unit configured to supply a gate signal and a data signal to the liquid crystal panel;
an inverter unit configured to drive the backlight unit with a 2-block scanning method using first and second dimming signals; and
a system unit configured to:
generate:
the first and second dimming signals;
an image signal;
a data enable signal;
a horizontal synchronization signal;
a vertical synchronization signal;
a clock signal for displaying the image;
a gate control signal;
a data control signal; and
an RGB signal using the image signal, the data enable signal, the horizontal synchronization signal, the vertical synchronization signal, and the clock signal; and
transmit the first and second dimming signals directly to the inverter unit,
wherein the control unit is further configured to generate the gate signal and the data signal using the gate control signal, the data control signal, and the RGB signal received from the system unit.

7. The device according to claim 6, wherein:
the system unit includes first and second system connectors;
the inverter unit includes a first inverter connector;
the control unit includes a first control connector;
the first system connector is connected to the first inverter connector through a first cable; and
the second system connector is connected to the first control connector through a second cable.

8. The device according to claim 7, wherein:
each of the first system connector, the first cable, and the first inverter connector includes 14 pins; and
the system unit transmits a driving power source signal, a lamp flash signal, a lamp status signal, the first dimming signal, and the second dimming signal to the inverter unit through the first system connector, the first cable, and the first inverter connector.

9. The device according to claim 7, wherein:
the system unit includes a timing controller configured to generate the gate control signal, the data control signal, and the RGB signal; and
the system unit transmits the gate control signal, the data control signal, and the RGB signal to the control unit through the second system connector, the second cable, and the first control connector.

10. The device according to claim 9, wherein the system unit transmits the first and second dimming signals to the inverter unit without modulation.

11. The device according to claim 9, wherein the system unit:

modulates the first and second dimming signals based on a result of analyzing the image signal by the timing controller; and transmits the first and second dimming signals to the inverter unit.

12. The device according to claim 6, wherein:
the backlight unit includes a plurality of lamps parallel to and spaced apart from each other;
the plurality of lamps are divided into:
   a first block corresponding to upper and lower portions of the liquid crystal panel; and
   a second block corresponding to a middle portion of the liquid crystal panel; and
the first and second blocks are driven according to the first and second dimming signals, respectively.

13. A method of driving a liquid crystal display device, the method comprising:
generating first and second dimming signals for driving a backlight unit and an image signal, a data enable signal, a horizontal synchronization signal, a vertical synchronization signal, and a clock signal for displaying an image in a system unit, the system unit generating a gate control signal, a data control signal, and an RGB signal using the image signal, the data enable signal, the horizontal synchronization signal, the vertical synchronization signal, and the clock signal;
transmitting the gate control signal, the data control signal, and the RGB signal from the system unit to a control unit;
transmitting first and second dimming signal from the system unit directly to an inverter unit;
generating a gate signal and a data signal using the gate control signal, the data control signal, and the RGB signal in the control unit;
transmitting the gate signal and the data signal from the control unit to a liquid crystal panel;
displaying the image using the gate signal and the data signal by the liquid crystal panel;
driving the backlight unit with a 2-block scanning method using the first and second dimming signals by the inverter unit; and
supplying a light of the backlight unit to the liquid crystal panel.

14. The method according to claim 13, wherein transmitting the first and second dimming signals from the system unit to the inverter unit comprises transmitting a driving power source signal, a lamp flash signal, and a lamp status signal of the backlight unit from the system unit to the inverter unit.

15. The method according to claim 13, further comprising modulating the first and second dimming signals based on a result of analyzing the image signal by a timing controller of the system unit.

16. The method according to claim 13, wherein:
the backlight unit includes a plurality of lamps parallel to and spaced apart from each other; and
the plurality of lamps are divided into:
   a first block corresponding to upper and lower portions of the liquid crystal panel; and
   a second block corresponding to a middle portion of the liquid crystal panel.

17. The method according to claim 16, wherein supplying the light of the backlight unit to the liquid crystal panel comprises:
turning off the plurality of lamps of the first block and turning on the plurality of lamps of the second block during a first half frame of a single frame; and
turning on the plurality of lamps of the first block and turning off the plurality of lamps of the second block during a second half of the single frame.

* * * * *